United States Patent Office 3,514,461
Patented May 26, 1970

3,514,461
1,2,5,6-TETRAHYDROPYRIDINE AND 1,2-DIHYDROPYRIDINE DERIVATIVES
Noel F. Albertson, East Greenbush, N.Y., assignor to Sterling Drug Inc., New York, N.Y., a corporation of Delaware
No Drawing. Continuation-in-part of application Ser. No. 405,244, Oct. 20, 1964. This application Sept. 12, 1967, Ser. No. 670,011
Int. Cl. C07d $29/38$
U.S. Cl. 260—290                                    5 Claims

ABSTRACT OF THE DISCLOSURE

N - methyl - 2 - (1 - naphthylmethyl) - 3 - (hydrogen or lower alkyl) - 4 - (lower alkyl) - 1,2 - dihydropyridines, obtained by interacting 3-(hydrogen or lower alkyl)-4-(lower alkyl)pyridine methiodides with 1-naphthylmethylmagnesium chloride, and their corresponding 1,2,5,6-tetrahydropyridine reduction products are useful as intermediates to certain 1,2,3,4,5,6 - hexahydro - 2,6 - methano-3 - naphth[2,1-f]azocines, and 3 - substituted derivatives thereof which have utility as anticonvulsants and analgesic antagonists.

---

This application is a continuation-in-part of my prior copending application Ser. No. 405,244, filed Oct. 20, 1964, now U.S. Pat. 3,382,249.

This invention relates to chemical compositions of matter classified as 1,2,5,6 - tetrahydropyridines and 1,2 - dihydropyridines.

The invention sought to be patented resides in the concept of N - methyl - 2 - (1 - naphthylmethyl) - 3 - ($R^2$)-4 - ($R^1$) - 1,2,5,6 - tetrahydropyridines and N - methyl-2 - (1 - naphthylmethyl) - 3 - ($R^2$) - 4 - ($R^1$) - 1,2 - dihydropyridines, wherein in each instance $R^1$ is lower alkyl and $R^2$ is hydrogen or lower alkyl. As described more fully hereinafter, these compounds are useful as intermediates in the preparation of certain 1,2,3,4,5,6 - hexahydro - 2,6 - methano - 3 - naphth[2,1-f] azocines having utility as pharmacodynamic agents.

As used herein, the term "lower alkyl" means in each instance monovalent radicals of relatively low molecular weight derived from saturated branched and unbranched aliphatic hydrocarbons; the preferred alkyl radicals have 1–4 carbon atoms as illustrated by, but not limited to, methyl, ethyl, n-propyl, isopropyl, and n-butyl.

The new 1,2-dihydropyridines of this invention are obtained by interacting 3 - ($R^2$) - 4 - ($R^1$) - pyridine methiodide, wherein $R^1$ and $R^2$ have the same significance indicated hereinabove, with 1 - naphthylmethylmagnesium chloride in anhydrous diethyl ether. The reaction mixture thus obtained is mixed with ice water containing ammonium chloride, concentrated ammonium hydroxide is added to make the mixture basic, and the upper, ethereal layer of the two layers which form is separated, filtered, concentrated and, if desired, purified to yield N-(or 1) methyl - 2 - (1 - naphthylmethyl) - 3 - ($R^2$) - 4 - ($R^1$)-1,2-dihydropyridine.

The new 1,2,5,6-tetrahydropyridines of this invention are obtained by reducing the above-described corresponding 1,2-dihydropyridines with sodium borohydride or by catalytic hydrogenation.

The structures of the compounds of this invention followed from the methods of synthesis which were used and from the elementary analyses of the products obtained.

My invention is illustrated by the following examples without, however, being limited thereto.

EXAMPLE 1

A solution of 274 g. of 1-naphthylmethyl chloride in 1250 ml. of anhydrous diethyl ether was added slowly over a period of approximately two and one-half hours to a refluxing mixture of 258 ml. of anhydrous diethyl ether and 37.2 g. of magnesium turnings. The liquid in the reaction mixture was then siphoned away from the solid, which remained at the bottom of the reaction vessel, into a solution of 376 g. of 3,4-dimethylpyridine methiodide in 1500 ml. of anhydrous diethyl ether. The resulting mixture was then stirred for approximately ten minutes, and the reaction mixture thus obtained was poured into a mixture of ice and water having approximately 50 g. of ammonium chloride dissolved therein. When the mixture was made basic by addition of 500 ml. of concentrated ammonium hydroxide, two layers formed, a lower, aqueous layer and an upper, ethereal layer. The ethereal layer was then separated from the aqueous layer and was filtered. The filtrate was concentrated to yield 267 g. of N,3,4 - trimethyl - 2 - (1 - naphthylmethyl) - 1,2 - dihydropyridine as a red oil.

EXAMPLE 2

When 3 - methyl - 4 - ethylpyridine methiodide is substituted for the 3,4-dimethylpyridine methiodide in the procedure described in Example 1 above, there is obtained as the product N,3 - dimethyl - 2 - (1 - naphthylmethyl)-4-ethyl-1,2-dihydropyridine.

EXAMPLE 3

When 4-n-propylpyridine methiodide is substituted for the 3,4-dimethylpyridine methiodide in the procedure described in Example 1 above, there is obtained as the product N - methyl - 2 - (1 - naphthylmethyl) - 4 - n - propyl-1,2-dihydropyridine.

EXAMPLE 4

267 g. of N,3,4 - trimethyl - 2 - (1 - naphthylmethyl)-1,2-dihydropyridine obtained as described in Example 1 above was dissolved in 1 liter of ethanol, and to this solution there was gradually added at 15–20° C., with stirring, 28 g. of sodium borohydride in 240 ml. of water. The reaction mixture was stirred at room temperature for four hours, and then the ethanol was distilled from the reaction mixture under reduced pressure, leaving a nearly dry residue. To this residue were added water, hydrochloric acid, and diethyl ether. Three layers formed in the mixture. The uppermost, ethereal layer was separated and discarded. The two lower layers were made basic by addition of potassium carbonate, and the mixture was then extracted with diethyl ether. The ethereal extract was dried, and concentrated under reduced pressure, and the residue was distilled. The fraction distilling at 148–156° C. at 0.2–0.6 mm. pressure, which weighed 148 g., was N,3,4 - trimethyl - 2 - (1 - naphthylmethyl) - 1,2,5,6-tetrahydropyridine.

EXAMPLE 5

When N,3 - dimethyl - 2 - (1 - naphthylmethyl) - 4-ethyl-1,2-dihydropyridine, obtained as described in Example 2 above, is reduced with sodium borohydride following the manipulative procedure described in Example 4 above, there is obtained as the product N,3-dimethyl-2-(1-naphthylmethyl) - 4 - ethyl - 1,2,5,6 - tetrahydropyridine.

EXAMPLE 6

When N - methyl-2-(1-naphthylmethyl)-4-n-propyl-1,2-dihydropyridine, obtained as described in Example 3 above, is reduced with sodium borohydride following the manipulative procedure described in Example 4 above, there is obtained as the product N-methyl-2-(1-naphthylmethyl)-4-n-propyl-1,2,5,6-tetrahydropyridine.

The N - methyl-2-(1-naphthylmethyl)-3-($R^2$)-4-($R^1$)-1,2-dihydropyridines of this invention are useful as intermediates for the preparation of the corresponding N- methyl - 2 - (1 - naphthylmethyl)-3-(R²)-4-(R¹)-1,2,5,6-tetrahydropyridines. And the latter are useful as intermediates for the preparation of the 1,2,3,4,5,6-hexahydro-6-(R¹)-13-(R²)-2,6-methano-3-naphthazocines and 3-(or N-)substituted derivatives thereof described and claimed in my prior copending application Ser. No. 405,244, filed Oct. 20, 1964.

These 1,2,3,4,5,6 - hexahydro - 6 - (R¹) - 13-(R²)-2,6-methano-3-naphth[2,1-f]azocines are obtained by heating N - methyl - 2-(1-naphthylmethyl)-3-(R²)-4-(R¹)-1,2,5,6-tetrahydropyridine with an appropriate cyclizing agent, such as concentrated hydrobromic or phosphoric acid, to yield a mixture of the racemic cis and the racemic trans forms of 1,2,3,(4,5,6-hexahydro-3-methyl-6-(R¹)-13-(R²)-2,6-methano-3-naphth[2,1-f]azocine. The 3-methyl group is removed by treatment with cyanogen bromide to produce the corresponding 3-cyano compound which is converted by heating with dilute hydrochloric acid to the cis and trans forms of 1,2,3,4,5,6-hexahydro-6-(R¹)-13-(R²)-2,6-methano-3-naphth[2,1-f]azocine. The separation of cis and trans forms and resolution of racemic forms is readily accomplished, if desired, by conventional techniques. The naphthazocine products thus obtained can be N-acylated by treatment with one molecular equivalent of an acylating agent which is a member of the group consisting of acid halides and acid anhydrides of cycloalkanoic acids and cycloalkyl-lower alkanoic acids and reducing the resulting amide product, which contains a 3-cyclopropanecarbonyl or a 3-cyclopropyl-lower alkanoyl group, by treatment with a reducing agent effective to reduce the carbonyl of the amide to —CH₂—, for instance lithium aluminum hydride or equivalent thereof. There are thus obtained 1,2,3,4,5,6 - hexahydro-3-substituted-6-(R¹)-13-(R²) - 2,6 - methano-3-naphth[2,1-f]azocines having the formula

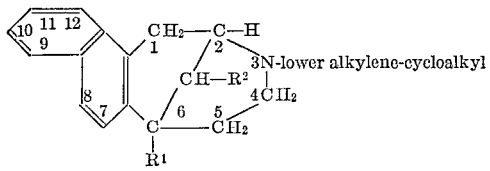

Formula I wherein R¹ and R² have the same significance indicated hereinabove. The term "lower alkylene" means bivalent radicals derived from saturated aliphatic hydrocarbons of relatively low molecular weight by removal of two hydrogens from one or two carbon atoms thereof; the preferred lower alkylene radicals have 1–4 carbon atoms, as illustrated by, but not limited to —CH₂—, —CH₂CH₂—, —CH₂CH₂CH₂—, CH₂—CH(CH₃)—, and

—CH₂CH₂CH₂CH₂—

The term "cycloalkyl" means monovalent radicals derived by removal of one atom of hydrogen from saturated monocyclic hydrocarbons; the preferred cycloalkyl radicals have 3–6 ring carbon atoms, as illustrated by, but not limited to, cyclopropyl, cyclobutyl, 3,3-dimethylcyclobutyl, cyclopentyl, and cyclohexyl.

The compounds of Formula 1 are typically high-boiling liquids which form high-melting, white crystalline hydrochlorides and which have pharmacodynamic activity and are useful as anticonvulsants and as antagonists of certain strong analgesic agents, such as morphine and meperidine. They can exist in stereochemically isomeric forms, that is, optical isomers and geometric isomers. When desired, the isolation or the production of a particular stereochemical form can be accomplished by application of the general principles known in the prior art. Due to the presence of a basic tertiary amino grouping, the compounds of Formula 1 react with organic and inorganic acids to form acid-addition salts. These acid-addition salts are prepared in conventional fashion from any organic acid, inorganic acid (including organic acids having an inorganic group therein), or organo-metallic acid.

The conversion of the herein-claimed intermediates to the 1,2,3,4,5,6 - hexahydro-2,6-methano-3-naphth[2,1-f]-azocines of Formula 1 is illustrated by the following examples.

EXAMPLE I 1,2,3,4,5,6 - hexahydro - 3 - cyclopropylmethyl - 6,13 - dimethyl-2,6-methano-3-naphth[2,1-f]azocine (A) A mixture of 147 g. of 2-(1-naphthylmethyl)-1,3,4-trimethyl-1,2,5,6-tetrahydropyridine and 1500 ml. of concentrated (48 percent) hydrobromic acid was refluxed for approximately twenty-four hours. The reaction mixture was concentrated under reduced pressure, and the resulting residue was partitioned between water (2 liters) and ethyl acetate (400 ml.), the ethyl acetate layer being discarded. The aqueous layer was made basic by addition of potassium carbonate and the mixture was then extracted with diethyl ether. The ethereal extract was dried, and concentrated under reduced pressure to yield 134 g. of a dark oil. This oil was dissolved in 100 ml. of acetone, and the solution was chilled. The solid which formed was collected on a filter, washed with a few ml. of acetone, and dried. There was thus obtained 89.9 g. of solid which melted at 55–73° C. This product was combined with a 31 g. portion of the same product from another run, and the combined solid was fractionated, using column chromatography (silica-benzene) to yield the racemic cis (M.P. 81° C.) and racemic trans (M.P. 135° C.) forms of 1,2,3,4,5,6 - hexahydro - 3 - methyl - 6,13 - dimethyl-2,6-methano - 3 - naphth[2,1-f]azocine; these assignments of configuration were confirmed by nuclear magnetic resonance spectra.

(B) A solution of 42 g. of racemic 1,2,3,4,5,6-hexahydro-3-methyl-cis-6,13-dimethyl-2,6-methano - 3 - naphth[2,1-f]azocine in 210 ml. of chloroform was added dropwise with stirring to a solution of 17 g. of cyanogen bromide in 170 ml. of chloroform at room temperature. The resulting mixture was refluxed for three hours. The reaction mixture was then concentrated under reduced pressure to yield an orange-colored oil which consisted chiefly of racemic 1,2,3,4,5,6-hexahydro-3-cyano-cis-6,13-dimethyl-2,6-methano-3-naphth[2,1-f]azocine. To this oil there were added 105 ml. of concentrated hydrochloric acid and 535 ml. of water, and the mixture was refluxed for about twenty-four hours. The reaction mixture was then concentrated under reduced pressure, diethyl ether and a small volume of water were added, and the ether layer was separated from the mixture. The residue was stirred with a mixture of diethyl ether, water, and ammonium hydroxide for one hour. The mixture was filtered to remove a small amount of solid, and the ethereal and aqueous layers in the filtrate were separated. The ethereal layer was dried and then concentrated under reduced pressure to yield 30.5 g. of brown oil as a residue. This oil was distilled to obtain a fraction weighing 28.1 g. which distilled at 151–154° C. at 0.4–0.6 mm. pressure. A small amount of this product, which was racemic 1,2,3,4, 5,6-hexahydro-cis-6,13-dimethyl-2,6-methano - 3 - naphth[2,1-f]azocine, was converted to its hydrochloride, the latter being a white crystalline solid which melted at 283–287° C.

(C) A solution of 15 g. of racemic 1,2,3,4,5,6-hexahydro-3-methyl-trans-6,13-dimethyl-2,6-methano-3 - naphth[2,1-f]azocine in 75 ml. of chloroform was added dropwise with stirring to a solution of 6.1 g. of cyanogen bromide in 60 ml. of chloroform at room temperature. The resulting mixture was refluxed with stirring for three hours. The reaction mixture was then concentrated under reduced pressure to yield 24.1 g. of racemic 1,2,3,4,5,6-hexahydro-3-cyano-trans-6,13-dimethyl-2,6 - methano - 3-naphth[2,1-f]azocine as an oil. To this oil there were added 190 ml. of water and 38 ml. of concentrated hydrochloric acid, and the mixture was refluxed for twenty-four hours. The reaction mixture was then concentrated under reduced pressure, water and diethyl ether were mixed with the resulting mixture, and thereafter the ether was removed by evaporation under reduced pressure. The mixture was made basic by addition of ammonium hydroxide and was then extracted with diethyl ether while stirring for a period of one hour. The ethereal extract was dried, concentrated under reduced pressure, and distilled. The fraction distilling at 153–156° C. at 0.5 mm. pressure weighed 8.5 g. A small amount of this product, which was racemic 1,2,3,4,5,6-hexahydro-trans-6,13-dimethyl-2,6-methano - 3 - naphth[2,1 - f]azocine, was converted to its hydrochloride, the latter being a white crystalline solid which melted at 329–337° C.

(D) A solution of 3.6 g. of cyclopropanecarbonyl chloride in 25 ml. of chloroform was dropped into a mixture of 8.3 g. of racemic 1,2,3,4,5,6-hexahydro-cis-6,13-dimethyl-2,6-methano-3 - naphth[2,1 - f]azocine, 50 ml. of dry chloroform, and 5 ml. of triethylamine at 10° C. with stirring. The reaction mixture was stirred for four hours at room temperature and was then washed successively with water, dilute hydrochloric acid, and water. The reaction mixture was then dried and concentrated under reduced pressure to yield 10.0 g. of racemic 1,2,3,4,5,6-hexahydro-3-cyclopropanecarbonyl - cis - 6,13 - dimethyl-2,6-methano-3-naphth[2,1-f]azocine as a light pink oil.

A mixture of 10.0 g. of racemic 1,2,3,4,5,6-hexahydro-3-cyclopropanecarbonyl-cis-6,13-dimethyl-2,6 - methano-3-naphth[2,1-f]azocine in 105 g. of tetrahydrofuran and 3 g. of lithium aluminum hydride in 45 ml. of tetrahydrofuran was stirred and refluxed for six hours. To the reaction mixture there was added 6 ml. of water, and the mixture was filtered. The filtrate was dried, and concentrated under reduced pressure. The viscous oil thus obtained, which weighed 9.6 g., was dissolved in 20 ml. of 95 percent ethyl alcohol, and 10 ml. of water was added to the solution, which was then refrigerated. The crystalline solid which separated from solution was collected on a filter. This product (8.1 g.) was recrystallized twice from ethyl alcohol-water to yield 5.0 g. of racemic 1,2,3,4,5,6-hexahydro-3-cyclopropylmethyl-cis-6,13 - dimethyl - 2,6-methano-3-naphth[2,1-f]azocine, having the molecular formula $C_{22}H_{27}N$, which melted at 78–81° C. The solubility of this product in water was less than 0.25 percent, it was insoluble in dilute acid; and its solubility in 95 percent ethyl alcohol was 1 percent (w./v.)

(E) Following the procedure of part (D) of this example but using the dextro form in one instance, and the levo form in another instance, of 1,2,3,4,5,6-hexahydro-cis-6,13-dimethyl-1,6-methano - 3 - naphth[2,1 - f]azocine (resolved into the dextro and levo forms using d- and l-tartaric acids) instead of the racemic form used in part (D), the respective final products are the dextro-and the levo-forms of 1,2,3,4,5,6-hexahydro-3-cyclo-propylmethyl-cis-6,13-dimethyl-2,6-methano-3-naphth[2,1-f]azocine.

EXAMPLE II 1,2,3,4,5,6-hexahydro-3-cyclopropylmethyl-6,13-dimethyl-2,6-methano-3-naphth[2,1-f]azocine Following a procedure similar to that described in part (D) of Example I hereinabove, 7.4 g. of racemic 1,2,3,4,5,6 - hexahydro-trans - 6,13 - dimethyl - 2,6 - methano -3 - naphth[2,1-f]azocine in 50 ml. of chloroform and 4.5 ml. of triethylamine was N-acylated with 3.1 g. of cyclopropanecarbonyl chloride in 25 ml. of chloroform to yield 4.0 g. of racemic 1,2,3,4,5,6-hexahydro-3-cyclopropanecarbonyl-trans-6,13 - dimethyl - 2,6 - methano - 3 - naphth [2,1-f]azocine which melted at 134–136° C. This amide (2.8 g.) was reduced with lithium aluminum hydride (1 g.) in tetrahydrofuran to yield 3.6 g. of racemic 1,2,3, 4,5,6-hexahydro-3-cyclopropylmethyl-trans-6,13 - dimethyl-2,6-methano-3-naphth[2,1-f]azocine, having the molecular formula $C_{22}H_{27}N$. This base was converted to its hydrochloride, a white crystalline solid which melted at 249– 252° C. (dec.). The solubility of the hydrochloride in water was less than 0.25 percent; it was soluble in 95 percent ethyl alcohol to the extent of 1 percent and when the 1 percent solution was diluted with four volumes of water a precipitate formed.

EXAMPLE III 1,2,3,4,5,6-hexahydro-3-cyclobutylmethyl-6,13 - dimethyl-2,6-methano-3-naphth[2,1-f]azocine Following a procedure similar to that described in part (D) of Example I hereinabove, 8,3 g. of racemic 1,2,3,4, 5,6-hexahydro - cis-6,13-dimethyl-2,6-methano-3-naphth-[2,1-f]azocine in 50 ml. of chloroform and 5 ml. of triethylamine was N-acylated with 4.2 g. of cyclobutanecarbonyl chloride in 25 ml. of chloroform to yield 11.2 g. of racemic 1,2,3,4,5,6-hexahydro - 3 - cyclobutanecarbonyl-cis-6,13-dimethyl-2,6-methano - 3 - naphth[2,1-f]azocine. This amide (11 g.) was reduced with lithium aluminum hydride (3.5 g.) in tetrahydrofuran to yield 5.7 g. of racemic 1,2,3,4,5,6-hexahydro - 3 - (cyclobutylmethyl)-cis-6,13-dimethyl - 2,6 - methano-3-naphth[2,1-f]azocine, having the molecular formula $C_{23}H_{29}N$, in the form of white crystals which melted at 80–83° C. The solubility of this compound in water was less than 0.25 percent; it was soluble in 95 percent ethyl alcohol to the extent of 1 percent (w./v.), and when four volumes of water was added to the 1 percent solution, a precipitate formed.

EXAMPLE IV 1,2,3,4,5,6-hexahydro - 3 - (2 - cyclopropylethyl)-6,13-dimethyl-2,6-methano-3-naphth[2,1-f]azocine When cyclopropaneacetyl chloride in equivalent amount is substituted for the cyclopropanecarbonyl chloride reactant in the N-acylation procedure in part (D) of Example I, the amide product obtained is racemic 1,2,3,4,5,6-hexahydro-3-cyclopropaneacetyl - cis - 6,13-dimethyl-2,6-methano-3-naphth[2,1-f]azocine; and reduction of this amide with lithium aluminum hydride in tetrahydrofuran yields racemic 1,2,3,4,5,6 - hexahydro-3-(2 - cyclopropylethyl)-cis-6,13-dimethyl-2,6-methano-3-naphth[2,1-f]azocine.

The following are further illustrative examples of the compounds of Formula 1 which are obtained by proceeding in accordance with the methods hereinabove described:

1,2,3,4,5,6-hexahydro-3-(2-cyclopropylpropyl)-6,13-dimethyl-2,6-methano-3-naphth[2,1-f]azocine;
1,2,3,4,5,6-hexahydro-3-cyclopropylmethyl-6-ethyl-13-methyl-2,6-methano-3-naphth[2,1-f]azocine;
1,2,3,4,5,6-hexahydro-3-(4-cyclohexylbutyl)-6-ethyl-2,6-methano-3-naphth[2,1-f]azocine; and
1,2,3,4,5,6-hexahydro-3-(3-cyclobutylpropyl)-6-n-propyl-13-methyl-2,6-methano-3-naphth[2,1-f]azocine.

Compounds of Formula 1 hereinabove which were prepared as described above were found to be active in one or both of two different standard anticonvulsant screening tests in mice, namely in antimaximal electroshock seizures and in antimaximal pentylenetetrazol seizures. In the antimaximal electroshock seizure test, the compounds were administered intraperitoneally or perorally thirty or ninety minutes prior to the application of 50 milliamperes of alternating current through corneal electrodes. Shock duration was 0.3 second. The criterion for anticonvulsant activity was the absence of the tonic hind leg extensor component of the seizure. In the antimaximal pentylenetetrazol seizure test, the compounds were given intraperitoneally thirty or ninety minutes prior to the rapid intravenous injection of 50 mg. per kg. of pentylenetetrazol. Failure to display tonic hind leg extensor seizures was again the criterion for drug action.

The subject matter which I regard as my invention is particularly pointed out and distinctly claimed as follows:
1. A compound of the group consisting of N-methyl-2-(1-naphthylmethyl)-3-($R^2$) - 4 - ($R^1$)-1,2,5,6-tetrahydropyridine and N-methyl-2-(1-naphthylmethyl) - 3 - ($R^2$)-

4-($R^1$)-1,2-dihydropyridine, wherein in each instance $R^1$ is lower alkyl and $R^2$ is a member of the group consisting of hydrogen and lower alkyl.

2. N-methyl - 2 - (1 - naphthylmethyl)-3-($R^2$)-4-($R^1$)-1,2,5,6 - tetrahydropyridine according to claim 1 wherein $R^2$ is lower alkyl.

3. N-methyl - 2 - (1 - naphthylmethyl)-3-($R^2$)-4-($R^1$)-1,2,5,6-tetrahydropyridine according to claim 2 wherein each of $R^1$ and $R^2$ is methyl.

4. N-methyl - 2 - (1 - naphthylmethyl)-3-($R^2$)-4-($R^1$) 1,2 - dihydropyridine according to claim 1 wherein $R^2$ is lower alkyl.

5. N-methyl-2-(1-naphthylmethyl)-3-($R^2$) - 4 - ($R^1$)-1,2-dihydropyridine according to claim 4 wherein each of $R^1$ and $R^2$ is methyl.

References Cited
UNITED STATES PATENTS 3,093,650   1963   Fry et al. _____ 260—290

HENRY R. JILES, Primary Examiner

H. I. MOATZ, Assistant Examiner

U.S. Cl. X.R.

424—263